United States Patent Office 3,413,308
Patented Nov. 26, 1968

3,413,308
SUBSTITUTED BENZO(b)THIOPHENE-2-
CARBOXANILIDES
Earl R. Bockstahler, Acton, Ind., assignor to The Dow
Chemical Company, Midland, Mich., a corporation of
Delaware
No Drawing. Filed Sept. 2, 1966, Ser. No. 576,860
4 Claims. (Cl. 260—330.5)

ABSTRACT OF THE DISCLOSURE

Substituted 3-hydroxybenzo(b)thiophene-2-carboxanilides are prepared by the reaction of a methyl 3-hydroxybenzo(b)thiophene-2-carboxylate with a substituted aniline. The compounds are useful as pesticides for the control of various fungal, fish, mollusk and schistosome organisms.

The present invention is directed to novel benzo(b)thiophene-2-carboxanilides corresponding to the formula

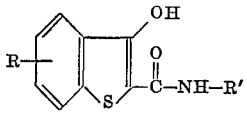

wherein R represents hydrogen or chlorine and R' represents chlorophenyl, dichlorophenyl, trichlorophenyl or chloronitrophenyl. The compounds of the present invention are crystalline solids which are only slightly soluble in water and common organic solvents such as alcohol, benzene, and dioxane. The compounds of the present invention have been found to be useful as pesticides for the control of various fungal, fish, mollusk and schistosome organisms. Representative pest organisms include golden carp, snails and *Verticillum alboatrum* and *Schistosoma mansoni*.

The compounds of the present invention are prepared by contacting together a methyl 3-hydroxybenzo(b)thiophene-2-carboxylate corresponding to the formula

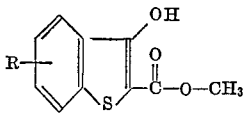

and a substituted aniline corresponding to the formula

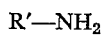

R'—NH$_2$

The reaction is carried out in the presence of an inert organic solvent as reaction medium. The reaction proceeds readily with the production of the desired product at temperatures between 120° C. and 175° C. and preferably at the boiling temperature of the reaction mixture. The proportions of the reactants to be employed are not critical, some of the desired product being obtained upon contacting the reactants in any proportions. However, the reaction consumes the starting materials in substantially equimolar proportions and the use of such proportions is generally preferred.

In carrying out the production of the benzo(b)thiophene-2-carboxanilide compounds of the present invention, the starting materials are contacted together in the presence of an inert organic solvent in any order or fashion. Representative inert organic solvents include xylene, chlorobenzene and dischlorobenzene. Following the contacting of the reactants, the reaction mixture is heated to and maintained at a temperature within the desired temperature range for a period of time. In a convenient procedure, the reaction mixture is heated at the boiling temperature of the reaction mixture and under reflux. Following the reaction period, the reaction mixture is cooled and the solid product which precipitates during cooling is collected by such conventional operations as filtration, decantation or centrifugation. The product thus obtained can be employed in pesticidal applications or further purified by such convenient procedures as washing or recrystallization.

The following examples are merely illustrative and are not intended to be limiting.

EXAMPLE 1

Methyl 3-hydroxybenzo(b)thiophene-2-carboxylate (20.8 grams) and 2-chloro-4-nitroaniline (17.3 grams) were dispersed in 100 milliliters of xylene. The reaction mixture thus prepared was heated at the boiling temperature and at a rate such that the vapors which condensed at 100° C., were returned to the reaction mixture while the more volatile materials were allowed to distill off. Following the heating period, the reaction mixture was cooled and the solid product which precipitated during the cooling procedure collected by filtration. The filtered solid product was washed with hot glacial acetic acid and twice recrystallized from dioxane using decolorizing carbon. The recrystallized 2'-chloro-3-hydroxy-4'-nitrobenzo-(b)thiophene-2-carboxanilide product was found to melt at 254°–256° C.

EXAMPLE 2

Methyl 6-chloro-3-hydroxybenzo(b)thiophene-2-carboxylate (48.5 grams) and 2-chloro-4-nitroaniline (34.5 grams) were dispersed in 150 milliliters of xylene. The reaction mixture thus prepared was then heated at the boiling temperature and at the same rate as described in Example 1, for 48 hours. Following the reaction period, the reaction mixture was cooled and the solid product which precipitated therein was separated by filtration, recrystallized from dioxane and then recrystallized from xylene. The 2',6-dichloro-3-hydroxy-4'-nitrobenzo(b)thiophene-2-carboxanilide product thus recrystallized was found to melt at from 247°–249° C. Further successive recrystallizations from xylene yielded a product which melted at 252°–253° C.

In substantially the same manner the following compounds of the present invention are prepared.

2',4',6-trichloro-3-hydroxybenzo(b)thiophene-2-carboxanilide (melting at 242°–243° C.) by reacting methyl 6-chloro-3-hydroxybenzo(b)thiophene-2-carboxylate and 2,4-dichloroaniline.

2',4'-dichloro-3-hydroxybenzo(b)thiophene-2-carboxanilide (melting at 220°–221° C.) by reacting together methyl 3-hydroxybenzo(b)thiophene-2-carboxylate and 2,4-dichloroaniline.

4'-chloro-3-hydroxybenzo(b)thiophene-2-carboxanilide (melting at 239°–240° C.) by reacting methyl 3-hydroxybenzo(b)thiophene-2-carboxylate and 4-chloroaniline.

4',6-dichloro-3-hydroxybenzo(b)thiophene-2-carboxanilide (melting at 252°–253° C.) by reacting methyl 6-chloro-3-hydroxybenzo(b)thiophene-2-carboxylate and 4-chloroaniline.

3',5'-dichloro-3-hydroxybenzo(b)thiophene-2-carboxanilide (molecular weight 338.1) by reacting methyl 3-hydroxybenzo(b)thiophene-2-carboxylate and 3,5-dichloroaniline.

4',5',7-trichloro-3-hydroxybenzo(b)thiophene-2-carboxanilide (molecular weight 372.8) by reacting methyl 3-hydroxy-7-chlorobenzo(b)thiophene-2-carboxylate and 4,5-dichloroaniline.

3',4',5',6-tetrachloro-3-hydroxybenzo(b)thiophene-2-carboxanilide (molecular weight 407) by reacting together methyl 3-hydroxy-6-chlorobenzo(b)thiophene-2-carboxylate and 3,4,5-trichloroaniline.

2',4',6'-trichloro-3-hydroxybenzo(b)thiophene-2- carboxanilide (molecular weight 372.8) by reacting together methyl 3-hydroxybenzo(b)thiophene-2-carboxylate and 2,4,6-trichloroaniline.

4',7 - dichloro - 6' - nitro - 3 - hydroxybenzo(b)thiophene-2-carboxanilide (molecular weight 383.1) by reacting together methyl 3-hydroxy-7-chlorobenzo(b)thiophene-2-carboxylate and 4-chloro-6-nitroaniline.

5' - chloro - 2' - nitro - 3 - hydroxybenzo(b)thiophene-2-carboxanilide (molecular weight 348.7) by reacting methyl 3-hydroxybenzo(b)thiophene-2-carboxylate and 5-chloro-2-nitroaniline.

The compounds of the present invention or compositions containing the same, can be applied to pests, their habitats and food in pesticidal amounts to obtain excellent control and kills of many organisms such as golden carp, snails, *Verticillum alboatrum* and *Schistosoma mansoni*.

The compounds can be employed in unmodified form or in liquid or dust formulations. In such formulations, the compounds are modified with one or a plurality of adjuvants or helpers including water, organic solvents, petroleum oils, petroleum distillates, or other liquid carriers, surface active dispersing agents and finely divided solids such as chalk, talc or bentonite. Depending upon the concentration of the pesticide compounds in such formulations, the augmented compositions are adapted to be distributed on plants or plant parts, in water or to be employed as concentrates and subsequently diluted with additional liquid or solid adjuvants to produce the ultimate treating composition.

The exact concentration of the benzo(b)thiophene-2-carboxanilide compounds of the present invention to be employed in the treating compositions is not critical and may vary considerably provided a pesticidal amount of the benzo(b)thiophene-2-carboxanilide compound is applied to the pest to be controlled or its habitat or food. The concentration of toxicant in liquid compositions generally is from about one to 50 percent by weight. Concentrations up to 95 percent by weight oftentimes are conveniently employed. In dusts, the concentration of the toxicant can be from about one to 10 percent by weight. In compositions to be employed as concentrates the benzo(b)thiophene-2-carboxanilides can be present in a concentration of from about 5 to about 98 percent by weight.

In representative operations, 2',4'-dichloro-3-hydroxybenzo(b)thiophene - 2 - carboxanilide, 4',6 - dichloro - 3 - hydroxybenzo(b)thiophene-2-carboxanilide, and 2',4',6-trichloro - 3 - hydroxybenzo(b)thiophene - 2 - carboxanilide each gave 100 percent kills of the fungus *Verticillum alboatrum* when employed as the sole toxic constituent in aqueous isopropanol compositions at a concentration of 100 parts per million. In such operations the composition containing the carboxanilide compound to be tested was added to the growing fungi and the percentage kill measured. In other operations, aqueous compositions containing 2'-chloro-3-hydroxy-4'-nitrobenzo(b)thiophene-2-carboxanilide and 2',6-dichloro-3-hydroxy-4'-nitrobenzo(b)thiophene-2-carboxanilide each gave 100 percent kill of ram's horn snail when added to the snail's aqueous environment in an amount sufficient to provide the carboxanilide at a concentration of 2 parts per million by weight with respect to the aqueous environment. In further operations, 2',6-dichloro-3-hydroxy - 4' - nitrobenzo(b)thiophene-2-carboxanilide and 2',4'-dichloro-3-hydroxybenzo(b)thiophene-2-carboxanilide each give complete control and kill of *Trichophyton mentagrophytes* when employed as the sole toxic constituent in aqueous compositions at a concentration of 100 parts per million by weight. Said compositions were applied to the growing Trichophyton organisms. In still further operations, 4'-chloro-3-hydroxybenzo(b)thiophene-2-carboxanilide and 2',6-dichloro-3-hydroxy-4'-nitrobenzo(b)thiophene-2-carboxanilide each gave complete kills of golden carp when placed in the aqueous environment of said fish as the sole active compound at a concentration of 2 parts per million by weight.

The methyl-3-hydroxybenzo(b)thiophene-2-carboxylates employed as starting materials in the present invention are prepared by conventional procedures. In a convenient procedure, an anthranilic acid corresponding to the formula

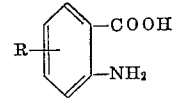

is diazotized by reacting it with nitrous acid. The resulting diazonium salts are treated with potassium ethyl xanthate, followed by basic hydrolysis and reaction with sodium chloroacetate to give a 2-carboxyphenylthioglycolic acid corresponding to the formula

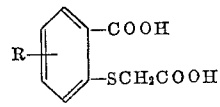

This acid is then esterified using a classical method such as reacting the glycolic acid with sulfuric acid and methanol. The resulting esters are treated with a solution of sodium methylate in methanol in order to bring about internal condensation and cyclization and the resultant formation of the desired methyl-3-hydroxy-benzo(b)thiophene-2-carboxylate starting material.

Representative methyl - 3 - hydroxybenzo(b)thiophene-2-carboxylates include, methyl 5-chloro-3-hydroxy-benzo(b)thiophene-2-carboxylate, methyl - 4-chloro-3-hydroxybenzo(b)thiophene-2-carboxylate, methyl 6 - chloro-3-hydroxybenzo(b)thiophene - 2 - carboxylate and methyl 7-chloro-3-hydroxybenzo(b)thiophene-2 - carboxylate. Representative anilines include 2,5-dichloroaniline, 3,4-dichloroaniline, 3,5-dichloroaniline, 2,4,5-trichloroaniline, 2-chloro-4-nitroaniline, 2-chloro-6-nitroaniline, 4- chloro-6-nitroaniline, 3 - chloro - 2 - nitroaniline and 5-chloro-2-nitroaniline.

I claim:
1. A benzo(b)thiophene - 2 - carboxanilide compound corresponding to the formula

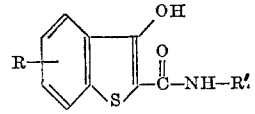

wherein R represents a member of the group consisting of hydrogen and chlorine, and R' represents a member of the group consisting of chlorophenyl, dichlorophenyl, trichlorophenyl and chloronitrophenyl.

2. The compound claimed in claim 1 which is 2'-chloro-3-hydroxy-4'-nitrobenzo(b)thiophene - 2 - carboxanilide.

3. The compound claimed in claim 1 which is 2',6-dichloro-3-hydroxy-4'-nitrobenzo(b)thiophene - 2 - carboxanilide.

4. The compound claimed in claim 1 which is 2',4'-dichloro-3-hydroxybenzo(b)thiophene-2-carboxanilide.

References Cited

FOREIGN PATENTS 69,680  8/1961  India.

OTHER REFERENCES

Bartlett et al., C.A. 28: 5439–40 (1934).
Hartough et al., Compounds with Condensed Thiophene Rings, (Interscience, New York, 1954), page 140.
Schulze et al., C.A. 43; 4417–8 (June 1949).

HENRY R. JILES, *Primary Examiner.*

C. M. SHURKO, *Assistant Examiner.*